US008653765B2

(12) United States Patent
Chang et al.

(10) Patent No.: US 8,653,765 B2
(45) Date of Patent: Feb. 18, 2014

(54) METHOD AND MODULE FOR CONTROLLING ROTATION OF A MOTORIZED SPINDLE

(75) Inventors: Paul Chang, Taichung (TW); Tsair-Rong Chen, Hemei Township, Changhua County (TW); Jeen-Sheen Row, Miaoli (TW); Chin-Sheng Lu, Taichung (TW)

(73) Assignees: Buffalo Machinery Co., Ltd, Taichung (TW); The Department of Electrical Engineering National Chang-Hua University of Education, Changhua, Changhua County (TW)

( * ) Notice: Subject to any disclaimer, the term of this patent is extended or adjusted under 35 U.S.C. 154(b) by 251 days.

(21) Appl. No.: 13/194,589

(22) Filed: Jul. 29, 2011

(65) Prior Publication Data
US 2011/0279075 A1  Nov. 17, 2011

Related U.S. Application Data

(63) Continuation-in-part of application No. 12/233,475, filed on Sep. 18, 2008, now abandoned.

(51) Int. Cl.
*H02P 1/00* (2006.01)
(52) U.S. Cl.
USPC ............ 318/128; 318/127; 318/460; 318/504
(58) Field of Classification Search
USPC ......... 318/460, 461, 478, 479, 504, 563, 565, 318/635, 127, 128
See application file for complete search history.

(56) References Cited

U.S. PATENT DOCUMENTS

| 5,412,302 | A |  | 5/1995 | Kido et al. |
|---|---|---|---|---|
| 6,338,024 | B1 |  | 1/2002 | Taniguchi et al. |
| 6,822,411 | B2 | * | 11/2004 | Kobayashi ................... 318/560 |
| 6,911,792 | B2 | * | 6/2005 | Fasen ............................ 318/116 |
| 7,168,783 | B2 | * | 1/2007 | Naito .............................. 347/37 |
| 7,449,850 | B2 | * | 11/2008 | Muroi ........................... 318/270 |
| 2009/0072768 | A1 |  | 3/2009 | Murray et al. |
| 2010/0066291 | A1 |  | 3/2010 | Chang et al. |

OTHER PUBLICATIONS

Office Action dated Feb. 1, 2011, U.S. Appl. No. 12/233,475.

* cited by examiner

*Primary Examiner* — Eduardo Colon Santana
*Assistant Examiner* — Thai Dinh
(74) *Attorney, Agent, or Firm* — Knobbe Martens Olson & Bear LLP

(57) ABSTRACT

In a method and module for controlling rotation of a motorized spindle driven by a driving unit, a sensing unit senses vibration of the spindle and generates a voltage signal corresponding to the vibration of the spindle. A processing unit receives the voltage signal from the sensing unit, generates an adjusting ratio equal to a reference voltage corresponding to a predetermined vibration level of the spindle by the voltage signal upon detecting that the voltage signal is greater than the reference voltage and is less than a predetermined threshold voltage that is greater than the reference voltage, and outputs a control signal corresponding to the adjusting ratio to the driving unit such that the driving unit reduces a rotation speed of the spindle by the adjusting ratio in response to the control signal from the processing unit.

9 Claims, 3 Drawing Sheets

METHOD AND MODULE FOR CONTROLLING ROTATION OF A MOTORIZED SPINDLE

CROSS-REFERENCE TO RELATED APPLICATIONS

This application is a continuation-in-part (CIP) of U.S. patent application Ser. No. 12/233,475, entitled "METHOD AND MODULE FOR CONTROLLING ROTATION OF A MOTORIZED SPINDLE," filed on Sep. 18, 2008.

BACKGROUND OF THE INVENTION

1. Field of the Invention

The invention relates to a method and module for controlling rotation of a motorized spindle.

2. Description of the Related Art

Vibration of high-speed spindles is considered a main cause of damage to such spindles.

Referring to FIG. 1, a conventional driving device 1 for a motorized spindle 2 is shown to include a detecting unit 11, and a driving unit 12 for driving the spindle 2. The detecting unit 11 generates a detecting signal upon detecting that vibration of the spindle 2 is greater than a predetermined vibration level, and outputs the detecting signal to the driving unit 12. The driving unit 12 stops driving the spindle 2 or reduces a rotation speed of the spindle 2 in accordance with the detecting signal from the detecting unit 11.

In such a driving device 1, it is important to appropriately decide the predetermined vibration level of the spindle 2. For example, if the predetermined vibration level of the spindle 2 is relatively high, the spindle 2 has been subjected to damaging vibration levels for a long period before the detecting unit 11 outputs the detecting signal to the driving unit 12, thereby reducing the service life of the spindle 2. On the other hand, if the predetermined vibration level of the spindle 2 is relatively low, the driving unit 12 reduces the rotation speed of the spindle 2 or stops driving the spindle 2, frequently, thereby adversely affecting transmission efficiency of the spindle 2.

SUMMARY OF THE INVENTION

Therefore, an object of the present invention is to provide a method and module for controlling rotation of a motorized spindle that can overcome the aforesaid drawbacks of the prior art.

According to one aspect of the present invention, there is provided a method of controlling rotation of a motorized spindle. The method comprises the steps of:

a) sensing vibration of the spindle;

b) generating a voltage signal corresponding to the vibration of the spindle;

c) determining whether the voltage signal generated in step b) is greater than a reference voltage corresponding to a predetermined vibration level of the spindle and is less than a predetermined threshold voltage that is greater than the reference voltage;

d) generating an adjusting ratio equal to the reference voltage divided by the voltage signal upon detecting that the voltage signal generated in step b) is greater than the reference voltage and is less than the threshold voltage in step c); and e) reducing a rotation speed of the spindle by the adjusting ratio.

According to another aspect of the present invention, there is provided a module for controlling rotation of a motorized spindle driven by a driving unit to rotate at a rotation speed. The module comprises:

a sensing unit adapted for sensing vibration of the spindle and for generating a voltage signal corresponding to the vibration of the spindle; and a processing unit coupled to the sensing unit and receiving the voltage signal generated by the sensing unit.

The processing unit is operable to determine whether the voltage signal is greater than a reference voltage corresponding to a predetermined vibration level of the spindle and is less than a predetermined threshold voltage that is greater than the reference voltage, to generate an adjusting ratio equal to the reference voltage divided by the voltage signal upon detecting that the voltage signal is greater than the reference voltage and is less than the predetermined threshold voltage, and to output a control signal corresponding to the adjusting ratio to the driving unit such that the driving unit reduces the rotation speed of the spindle by the adjusting ratio in response to the control signal from the processing unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
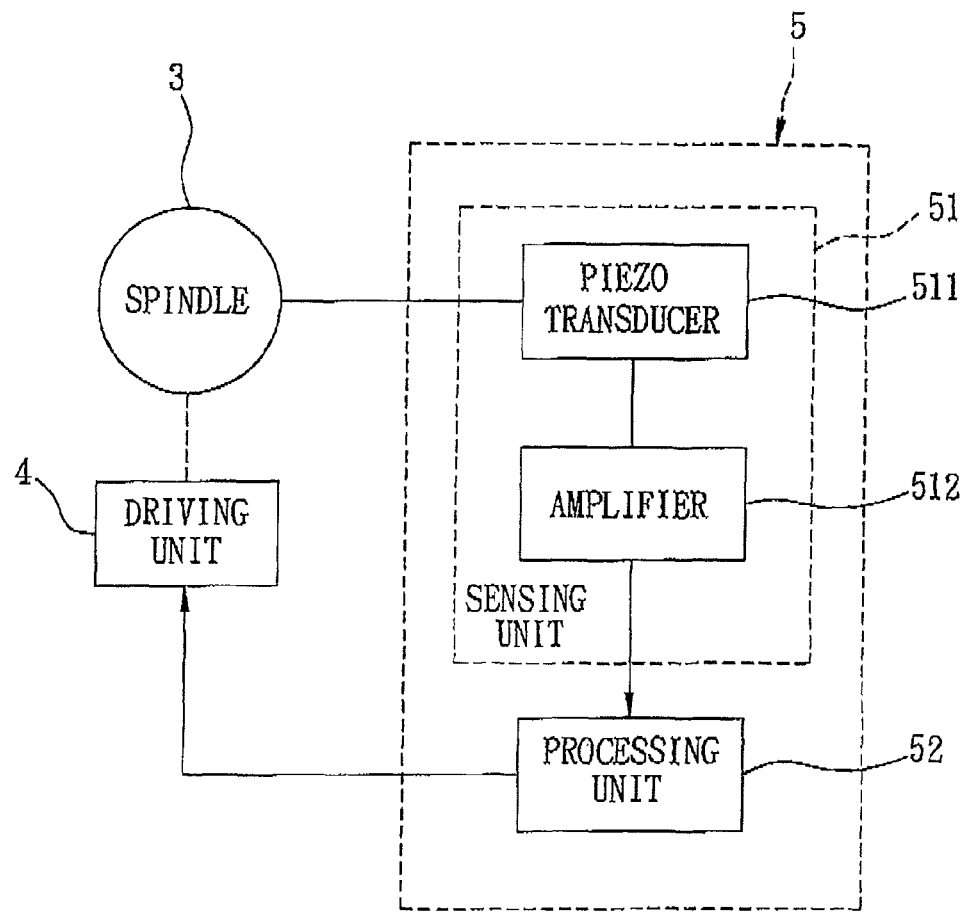
FIG. 3 is a schematic circuit block diagram illustrating a module for performing the method of the preferred embodiment.

Referring to FIG. 3, a module 5 for performing the preferred embodiment of a method of controlling rotation of a motorized spindle 3 according to the present invention is shown to include a sensing unit 51 and a processing unit 52. The spindle 3 is driven by a driving unit 4 to rotate at a rotation speed.

The sensing unit 51 is adapted for sensing vibration of the spindle 3, and generates a voltage signal corresponding to the vibration of the spindle 3. In this embodiment, the sensing unit 51 includes a piezo transducer 511 for sensing the vibration of the spindle 3 and for generating a voltage output in response to the vibration of the spindle 3, and an amplifier 512 (e.g., an operational amplifier) coupled to the piezo transducer 511 for amplifying the voltage output to result in the voltage signal.

The processing unit 52 is coupled to the amplifier 512 of the sensing unit 51 for receiving the voltage signal generated by the sensing unit 51. The processing unit 52 is operable to determine whether the voltage signal is greater than a reference voltage corresponding a predetermined vibration threshold of the spindle 3 and is less than a predetermined threshold voltage that is greater than the reference voltage, to generate an adjusting ratio equal to the reference voltage divided by the voltage signal upon detecting that the voltage signal is greater than the reference voltage and is less than the predetermined threshold voltage, and to output a control signal corresponding to the adjusting ratio to the driving unit 4 such that the driving unit 4 reduces the rotation speed of the spindle 3 by the adjusting ratio in response to the control signal from the processing unit 52. In this embodiment, the predetermined vibration level of the spindle 4 is equal to 2 mm/sec. The reference voltage is 2 volts. The predetermined threshold voltage is 4 volts. In addition, the processing unit 52 outputs a stop signal to the driving unit 4 upon detecting that the voltage signal generated by the sensing unit 51 is not less than the predetermined threshold voltage such that the driving unit 4 stops driving the spindle 3 in response to the stop signal from the processing unit 52. As such, the rotation speed of the spindle 3 is adjusted to be zero.

Figure 1:
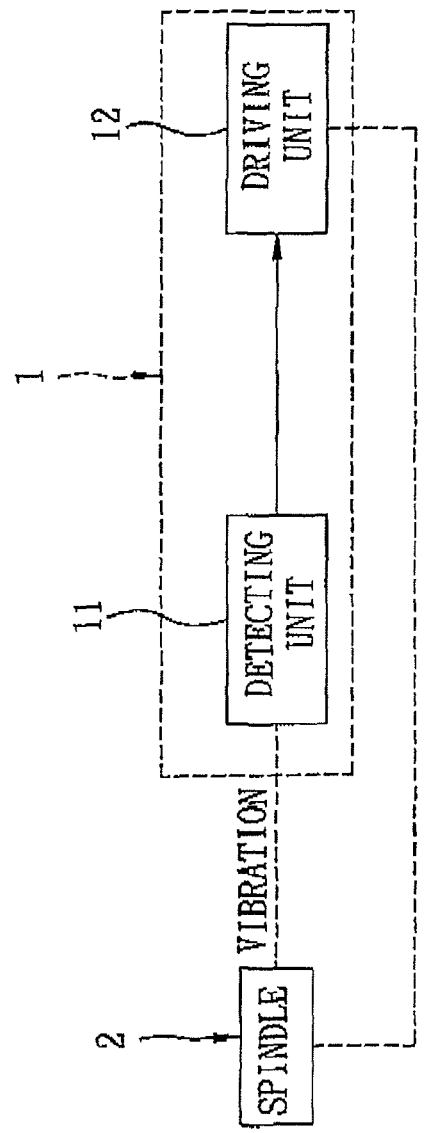
FIG. 1 is a schematic circuit block diagram of a conventional driving device for a motorized spindle.
Figure 2:
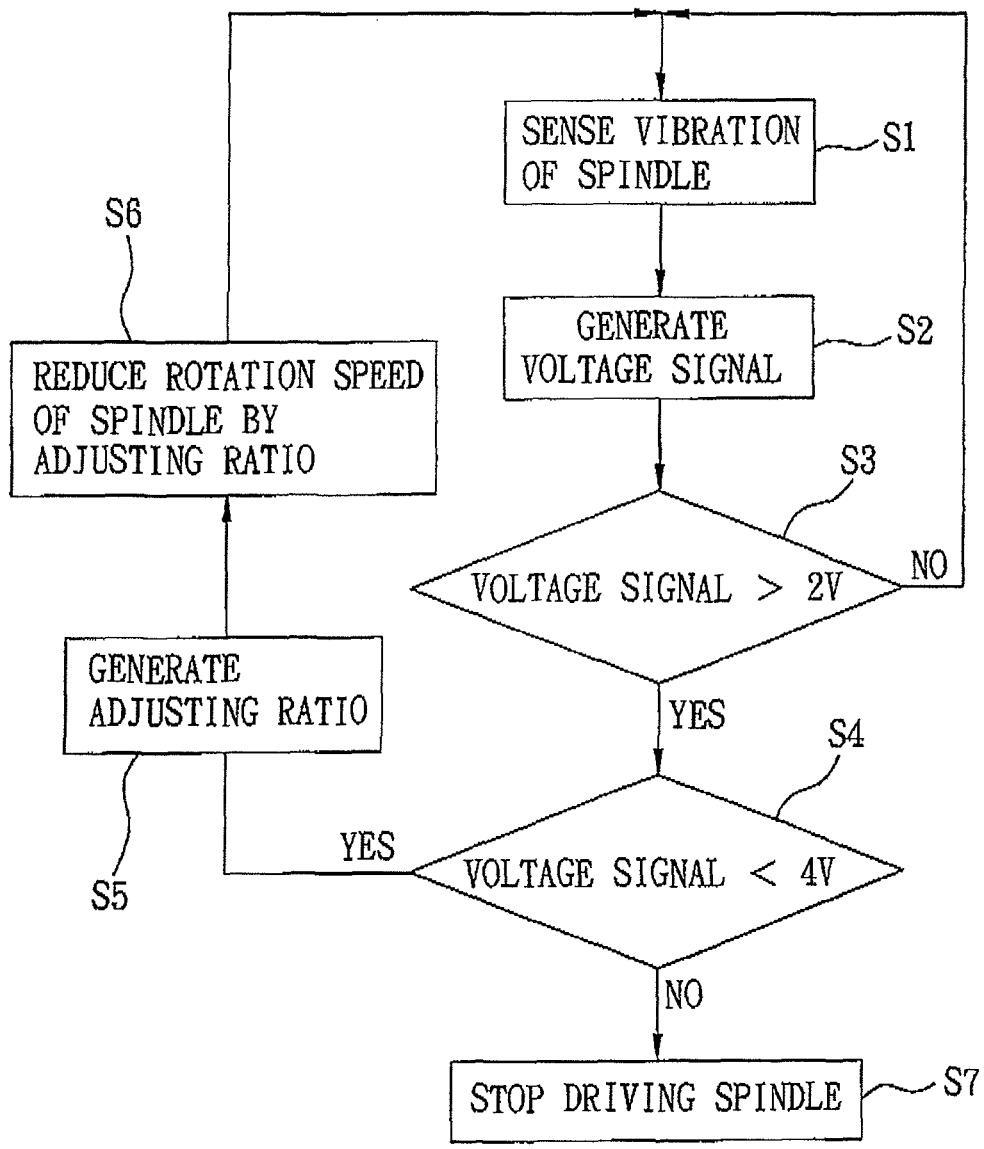
FIG. 2 is a flowchart illustrating the preferred embodiment of a method of controlling rotation of a motorized spindle according to the present invention.

Referring to FIG. 2, there is shown a flowchart to illustrate the method of the preferred embodiment.

In step S1, the piezo transducer 511 of the sensing unit 51 senses the vibration of the spindle 3 and generates the voltage output in response to the vibration of the spindle 3.

In step S2, the amplifier 512 of the sensing unit 51 amplifies the voltage output to generate the voltage signal.

In step S3, the processing unit 52 determines whether the voltage signal is greater than 2 volts, i.e., the reference voltage. If the result is negative, the flow goes back to step S1. In this case, the rotation speed of the spindle 3 remains unchanged. Otherwise, the flow proceeds to step S4.

In step S4, the processing unit 52 determines whether the voltage signal is less than 4 volts, i.e., the predetermined threshold voltage. If the result is affirmative, the flow proceeds to step S5. Otherwise, the flow proceeds to step S7.

In step S5, the processing unit 52 generates the adjusting ratio equal to the reference voltage divided by the voltage signal, and outputs a control signal corresponding to the adjusting ratio to the driving unit 4.

In step S6, the driving unit 4 reduces the rotation speed of the spindle 3 by the adjusting ratio in response to the control signal from the processing unit 52. Then, the flow goes back to step S1.

In step S7, the processing unit 52 outputs a stop signal to the driving unit 4 such that the driving unit 4 stops driving the spindle 3 in response to the stop signal from the processing unit 52.

In sum, the module 5 can appropriately control the rotation speed of the spindle 3 when the vibration of the spindle 3 is greater than the predetermined vibration level. Thus, the service life of the spindle 3 can be prolonged, and shutdown frequency of the spindle 3 can be minimized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of controlling rotation of a motorized spindle, comprising the steps of:
    a) sensing, by a sensing unit, vibration of the spindle;
    b) generating, by the sensing unit, a voltage signal corresponding to the vibration of the spindle;
    c) determining, by a processing unit, whether the voltage signal generated in step b) is greater than a reference voltage corresponding to a predetermined vibration level of the spindle and is less than a predetermined threshold voltage that is greater than the reference voltage;
    d) generating, by the processing unit, an adjusting ratio equal to the reference voltage divided by the voltage signal upon detecting that the voltage signal generated in step b) is greater than the reference voltage and is less than the threshold voltage in step c); and
    e) reducing, by the processing unit, a rotation speed of the spindle by the adjusting ratio.

2. The method as claimed in claim 1, further comprising the step of:
    f) upon detecting that the voltage signal generated in step b) is not less than the predetermined threshold voltage in step c), adjusting, by the processing unit, the rotation speed of the spindle to be zero.

3. The method as claimed in claim 1, wherein the predetermined vibration level of the spindle is equal to 2 mm/sec, and the reference voltage is 2 volts.

4. The method as claimed in claim 3, wherein the predetermined threshold voltage is 4 volts.

5. A module for controlling rotation of a motorized spindle driven by a driving unit to rotate at a rotation speed, said module comprising:
    a sensing unit adapted for sensing vibration of the spindle and for generating a voltage signal corresponding to the vibration of the spindle; and
    a processing unit coupled to said sensing unit and receiving the voltage signal generated by said sensing unit;
    wherein said processing unit is operable to determine whether the voltage signal is greater than a reference voltage corresponding to a predetermined vibration level of the spindle and is less than a predetermined threshold voltage that is greater than the reference voltage, to generate an adjusting ratio equal to the reference voltage divided by the voltage signal upon detecting that the voltage signal is greater than the reference voltage and is less than the predetermined threshold voltage, and to output a control signal corresponding to the adjusting ratio to the driving unit such that the driving unit reduces the rotation speed of the spindle by the adjusting ratio in response to the control signal from said processing unit.

6. The module as claimed in claim 5, wherein said processing unit outputs a stop signal upon detecting that the voltage signal is not less than the predetermined threshold voltage such that the driving unit stops driving the spindle in response to the stop signal from said processing unit.

7. The module as claimed in claim 5, wherein the predetermined vibration level of the spindle is equal to 2 mm/sec, and the reference voltage is 2 volts.

8. The module as claimed in claim 7, wherein the threshold voltage is 4 volts.

9. The module as claimed in claim 5, wherein said sensing unit includes a piezo transducer for generating a voltage output in response to the vibration of the spindle, and an amplifier for amplifying the voltage output to result in the voltage signal.

* * * * *